(12) United States Patent
Ettl et al.

(10) Patent No.: US 11,593,722 B2
(45) Date of Patent: Feb. 28, 2023

(54) METHOD AND STRUCTURE FOR RISK-BASED RESOURCE PLANNING FOR CONFIGURABLE PRODUCTS

(75) Inventors: Markus Ettl, Yorktown Heights, NY (US); Ching-Hua Chen-Ritzo, Mahopac, NY (US); John P. Fasano, Briarcliff Manor, NY (US); Aliza Rivka Heching, Bergenfield, NJ (US); Karthik Sourirajan, White Plains, NY (US); Robert J. Wittrock, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2773 days.

(21) Appl. No.: 11/960,404

(22) Filed: Dec. 19, 2007

(65) Prior Publication Data
US 2009/0164262 A1 Jun. 25, 2009

(51) Int. Cl.
*G06Q 10/06* (2012.01)
*G06Q 10/0631* (2023.01)

(52) U.S. Cl.
CPC ......... *G06Q 10/06* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 5,970,465 A * | 10/1999 | Dietrich | G06Q 10/06 705/7.22 |
| 6,405,308 B1 * | 6/2002 | Gupta et al. | 713/1 |
| 6,711,550 B1 * | 3/2004 | Lewis et al. | 705/10 |
| 7,539,297 B2 * | 5/2009 | Whitman, Jr. | 379/266.08 |
| 7,801,834 B2 * | 9/2010 | Frohnhoefer et al. | 705/400 |
| 7,809,604 B1 * | 10/2010 | Bensoussan | G06Q 10/06 705/7.25 |
| 7,809,831 B2 * | 10/2010 | Matsumitsu et al. | 709/226 |
| 2003/0229550 A1 * | 12/2003 | DiPrima | G06Q 10/087 705/28 |
| 2005/0065838 A1 * | 3/2005 | Kalagnanm | G06Q 10/0637 705/7.31 |
| 2005/0135600 A1 * | 6/2005 | Whitman, Jr. | 379/266.08 |
| 2007/0106798 A1 * | 5/2007 | Masumitsu et al. | 709/226 |
| 2007/0203856 A1 * | 8/2007 | Frohnhoefer et al. | 705/400 |

(Continued)

OTHER PUBLICATIONS

Verweij, Bram et al. "The Sample Average Approximation Method Applied to Stochastic Routing Problems: A Computational Study." Journal of Computational Optimization and Applications, vol. 24, Issues 2-3, Feb.-Mar. 2003.*

(Continued)

*Primary Examiner* — Jamie R Kucab
(74) *Attorney, Agent, or Firm* — Daniel Morris, Esq.; McGinn I.P. Law Group, PLLC.

(57) ABSTRACT

A method for planning under uncertainty is disclosed. The method includes steps of processing a stochastic programming formulation based on forecast values of at least one of product and service configurations, and determining a resource requirements plan for one or more planning periods in a non-deterministic bill of resources of at least two levels.

20 Claims, 6 Drawing Sheets

(56) References Cited

U.S. PATENT DOCUMENTS

2009/0099975 A1* 4/2009 Torre .................... G06Q 10/10
   705/36 R
2009/0144126 A1* 6/2009 Hosking ........................ 705/10
2009/0164262 A1* 6/2009 Ettl et al. .......................... 705/7

OTHER PUBLICATIONS

Grubbstrom, Robert W. and Zhipeng Wang. "A stochastic model and multi-level/multi-stage capacity-constrained production-inventory systems." International Journal of Production Economics 81-82 (2003), pp. 483-494.*

Chang, Mei-Shiang et al. "A scenario planning approach for the flood emergency logistics preparation problem under uncertainty." Transportation Research Part E 43 (2007), pp. 737-754.*

Mavris, Dimitri N. et al. "A stochastic approach for multi-disciplinary aircraft analysis and design." Presented at the 36th Aerospace Sciences Meeting & Exhibit, Jan. 12-15, 1998, in Reno NV.*

Internet Archive Wayback Machine archive of "Experience Using the IBM Supply Chain Simulator." Archived on Oct. 31, 2002. Available from <http://web.archive.org/web/20021031044811/http://www.research.ibm.com/ees/paper1.html>.*

* cited by examiner

METHOD AND STRUCTURE FOR RISK-BASED RESOURCE PLANNING FOR CONFIGURABLE PRODUCTS

BACKGROUND OF THE INVENTION

Field of the Invention

The present invention generally relates to a method and structure for resource requirements planning for configurable products or services. More specifically, a stochastic programming formulation based on forecast values allows a determination of resource requirements.

Description of the Related Art

When managing risk and flexibility in a configure-to-order supply chain, such as an automotive supply chain, it is important to account for the uncertainty associated with how finished products are configured (i.e., order configuration uncertainty) and to recognize the value of supply flexibility. Today, manufacturers typically perform capacity planning using "average" representations of product configurations and apply deterministic methods to align supply and demand.

For example, automotive companies allocate millions of dollars every year for new types of machine tools for the manufacture of automobiles. The variability in customer preferences, products, and technology makes it difficult for automotive manufacturers to estimate future capacity requirements. Moreover, the procurement of supplier capacity occurs before actual customer demand is realized, typically several years before production launch.

In the presence of order configuration uncertainty, a manufacturer or service provider runs the risks of overage (overstock), in which excess resources are invested in capacity, and shortage, in which sales and/or goodwill are lost if customers cannot obtain their preferred configurations. Both overstock and shortage reduce profits. An optimized resource plan that accounts for order configuration uncertainty would minimize the risk exposure of the manufacturer/service provider to both overstock and shortages.

An attach rate is defined for a component-product pair, and represents the quantity of a component that is used to configure the corresponding product. Examples of components in a manufacturing supply chain may include supplier parts and sub-assemblies. Examples of components in a services supply chain may include human resources such as software programmers, customer service representatives and project managers. Attach rates may be derived qualitatively (e.g., using rules of thumb or judgement based on experience with similar products or services), or quantitatively (e.g., using historical averages or driven by sales targets). When attach rates are treated as numerical constants, they do not account for variation or uncertainty in product configurations.

Figure 1:
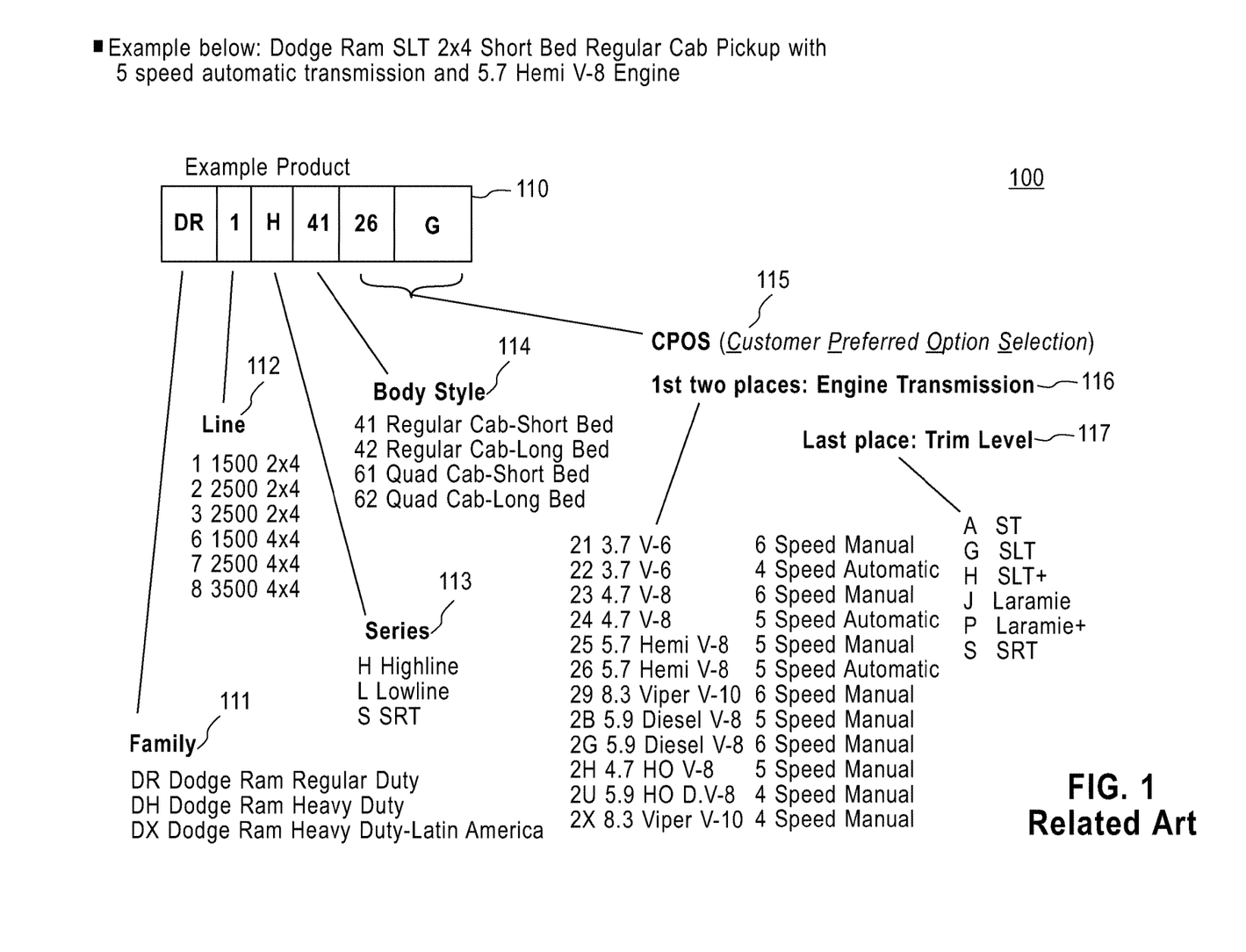
FIG. 1 shows an example 100 of options available in configuration of a vehicle.

In a configure-to-order supply chain, various components of a bill of resources must be determined prior to entering production. For example, FIG. 1 depicts a vehicle code of a pickup truck configuration. In an automobile, there may be within a single family platform 111 a variety of product lines 112, series 113, body styles 114, and trim levels 117, requiring different components or combinations of components. Some components, such as a vehicle platform, may be common to different configurations, and others may be unique to a particular configuration. Similarly, there may be options within each configuration where a single choice must necessarily be made from a set (for example: a single engine, or a single transmission selected from various manual and automatic transmission choices, 116). There may also be options which may be selected or declined; that is, no option is required to be selected (for example: a moon roof, a tow hitch, or a spoiler can be added to a vehicle, but no such option selection is required).

The various options may be combined in different ways. Some options might require or preclude others.

The components required for the various configurations constitute a bill of resources. A single-level bill of resources deals with only a product or service and its components.

The available options or allowable combinations of options might vary from one product planning period to another. For example, a six-speed manual transmission might be offered only in the second and subsequent model years of a vehicle. This is of particular concern because expensive production resources, such as investments in tooling and supplies, must often be arranged long before product configurations are in full production.

The procurement of supplier capacity has become more and more challenging for a number of reasons, including:

Product variety. Technology is changing rapidly, which means that new products and options are being introduced into manufacturing and planning processes all the time. This translates into ever changing requirements for capacity and tooling. Moreover, the choice of vehicle options available to customers has continuously increased, making forecasting future demand for stand-alone options and options packages even more difficult.

Procurement lead time. Most tooling equipment required by automotive suppliers is customized and made-to-order. The lead time for expanding capacity at a supplier (by purchasing additional tooling) could range anywhere from three months to several years. As a result, planners have to decide on supplier capacity based on forecasts of customer demand and customer preferences several years ahead where forecasts could be highly inaccurate.

Capacity cost. The cost of machine tools is significant, and automotive companies could spend tens of millions of dollars every quarter on procurement of new tools. Thus, even a small improvement in capacity planning decisions could have a large impact on the manufacturer's financial performance.

Various resource planning models for CTO (configure-to-order) systems are known. For example, Kessinger and Pieper (2005), "Managing risk with structured supply agreements"; Huang and Ahmed (2005), "The Value of Multistage Stochastic Programming in resource requirements Planning Under Uncertainty", working paper, Georgia Tech; Chen-Ritzo (2006), "Availability Management for Configure-to-Order Supply Chains", Dissertation, Penn State University. However, these models consider at most one level in the bill of resources (i.e., a product level and a component level). They fail to address the complexities of a multi-level model.

There are also known inventory models for CTO Systems, such as: Cheng, et al. (2002), "Inventory-Service Optimization in Configure-to-Order Systems", MSOM, and Lu, et al. (2003), "Order Fill Rate, Leadtime Variability, and Advance Demand Information in an Assemble-to-Order System". However, these models are used to study the structure of inventory ordering policies, not to compute a multi-period resource plan. That is, they cannot forecast needs and produce different resource plans for future periods.

The prior art also addresses demand conditioning for ATO (assemble-to-order) Systems. Ettl, et al. (2006) "Product Offering Conditioning in Assemble-To-Order Supply Chains", IBM Research Report RC23878, deals with deterministic models having specified take rates or attach rates, but has no uncertainty in the bill of resources. Chen-Ritzo, as discussed above, considers at most one level in the bill of resources (i.e., a product level and a component level).

Thus, a need exists to provide planning which deals with effects of uncertainty.

SUMMARY OF THE INVENTION

In a first exemplary aspect of the present invention, to achieve the above and other features and purposes, described herein is an exemplary method for planning under uncertainty, the method comprising: processing a stochastic programming formulation based on forecast values of at least one of product and service configurations, and determining a resource requirements plan for one or more planning periods in a non-deterministic bill of resources of at least two levels.

Preferably, the forecast values comprise random variables.

Preferably, the forecast values are expressed as range forecasts.

Preferably, the resource requirements plan comprises at least one of a capacity investment plan, a human resources deployment plan, a material requirements plan, and a skills requirements plan. Incidentally, a capacity investment plan describes the level of investment in capital resources in one or more time periods, for the purpose of meeting a business objective (e.g., related to forecasted demand for said resources). A human resources deployment plan is defined as a plan for allocating human resource supply to demand for those resources, as generated by forecasted demand. A skills requirements plan describes the quantities and types of skills required to meet a business objective (e.g., related to forecasted skills demand as generated by forecasted demand) in one or more future time periods. A material requirements plan describes the types and quantities of non-capital goods/materials needed to meet a business objective (e.g., related to forecasted material demands) in one or more time periods.

Preferably, the product and service configurations comprise one or more of an optional feature or service component which is not required in a final product or service configuration, a mandatory feature or service component which is required in a final product or service configuration, and a selective set of features, where one or more feature or service components of said selective set are required in a final product or service configuration.

Preferably, the method includes inputting a number of planning periods in a planning horizon.

Preferably, the forecast values of product or service configurations selectively vary across planning periods.

Preferably, the stochastic programming formulation comprises a two-stage stochastic program with recourse.

Preferably, the stochastic programming formulation is solved using Sample Average Approximation.

Preferably, the planning under uncertainty comprises determining sales targets for products or services in one or more planning periods.

Preferably, the forecast values comprise random variables expressed as range forecasts.

Preferably, the product and service configurations comprise one or more of an optional feature which is not required in a final product configuration, a mandatory feature which is required in a final product configuration, and a selective set of features, where exactly one feature of said selective set is required in a final product configuration and comprises two or more levels in the bill of resources.

Preferably, the method includes inputting a number of planning periods in a planning horizon.

Preferably, the forecast values of finished products and of product and service configurations selectively vary across planning periods.

Preferably, the stochastic optimization is formulated as a two-stage stochastic program with recourse.

Preferably, the stochastic optimization is solved using Sample Average Approximation.

Preferably, an optimal sales target is selected from an independent sample set of demand scenarios.

Preferably, the method includes a step of restricting said sales target to be within predetermined constraints.

In another exemplary aspect of the present invention, there is disclosed a computer-readable medium tangibly embodying a program of machine-readable instructions executable by a digital processing apparatus to perform a method of planning under uncertainty, the method comprising processing a stochastic programming formulation based on forecast values of product and service configurations, and determining a resource requirements plan for one or more planning periods in a non-deterministic bill of resources of at least two levels.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

This exemplary embodiment of the invention accounts for uncertainty in product configurations by treating attach rates as random variables, and incorporating information about these random variables (e.g., their probability distributions) when determining the optimal resource plan. When attach rates are random variables, then the bill of resources for the product is considered to be non-deterministic, or stochastic.

An exemplary feature of this invention is to position capacity and inventory in such a manner as to maximize the revenue generated from those assets. Given the uncertainties present in resource planning decisions, as reflected by forecast errors in top-level volume requirements and product configurations, the inventors have developed a rigorous mathematical framework for capacity planning based on stochastic optimization for managing the effects of demand and product configuration uncertainty. The framework aims at developing risk-adjusted capacity recommendations at all relevant levels of the product bill of materials and evaluating the overall performance of the supply chain against a range demand forecast for products. The range demand forecast captures the variable nature of the market by considering demand scenarios that may deviate from a projected average demand scenario.

It is an exemplary feature of the present invention to provide an analytical model for capacity procurement that incorporates the uncertainty in demand forecasts and configuration preferences, with the objective of maximizing one or more business objectives (e.g., minimizing shortage/overage costs, maximizing services levels, maximize revenue/profit). The demand scenarios are generated automatically by applying statistical sampling techniques to the range demand forecasts. The problem is modeled as a multi-period mathematical program. Without loss of generality, each period in this exemplary model represents one year because this is the typical length of a planning period used for capacity planning in the automotive industry. The possible outputs of the invention include one or more of the following: recommendations for capacity procurement, material procurement, material production, and sales targets for each period in the planning horizon.

Figure 2:
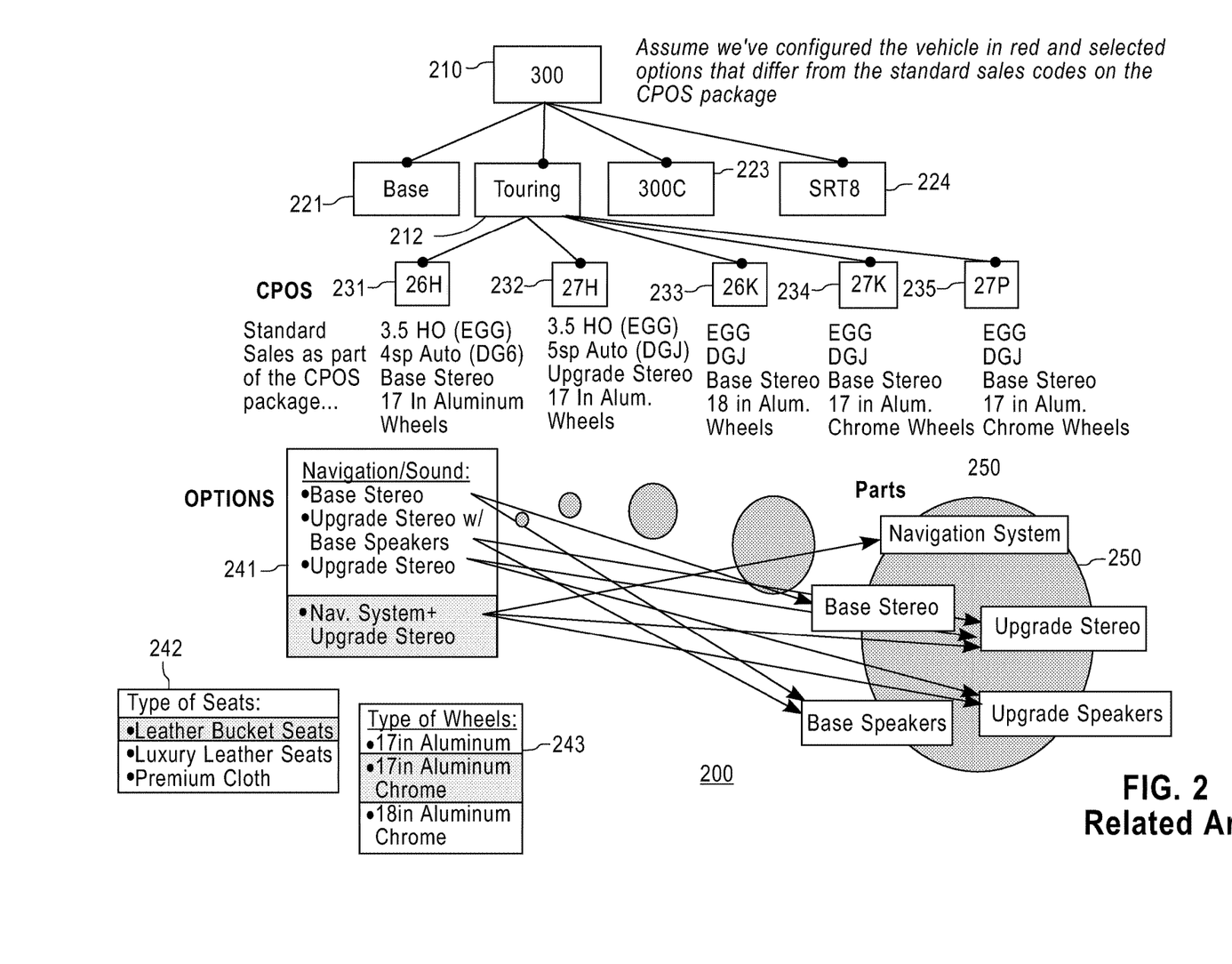
FIG. 2 shows an example 200 of a product hierarchy of an automotive family.
Figure 3:
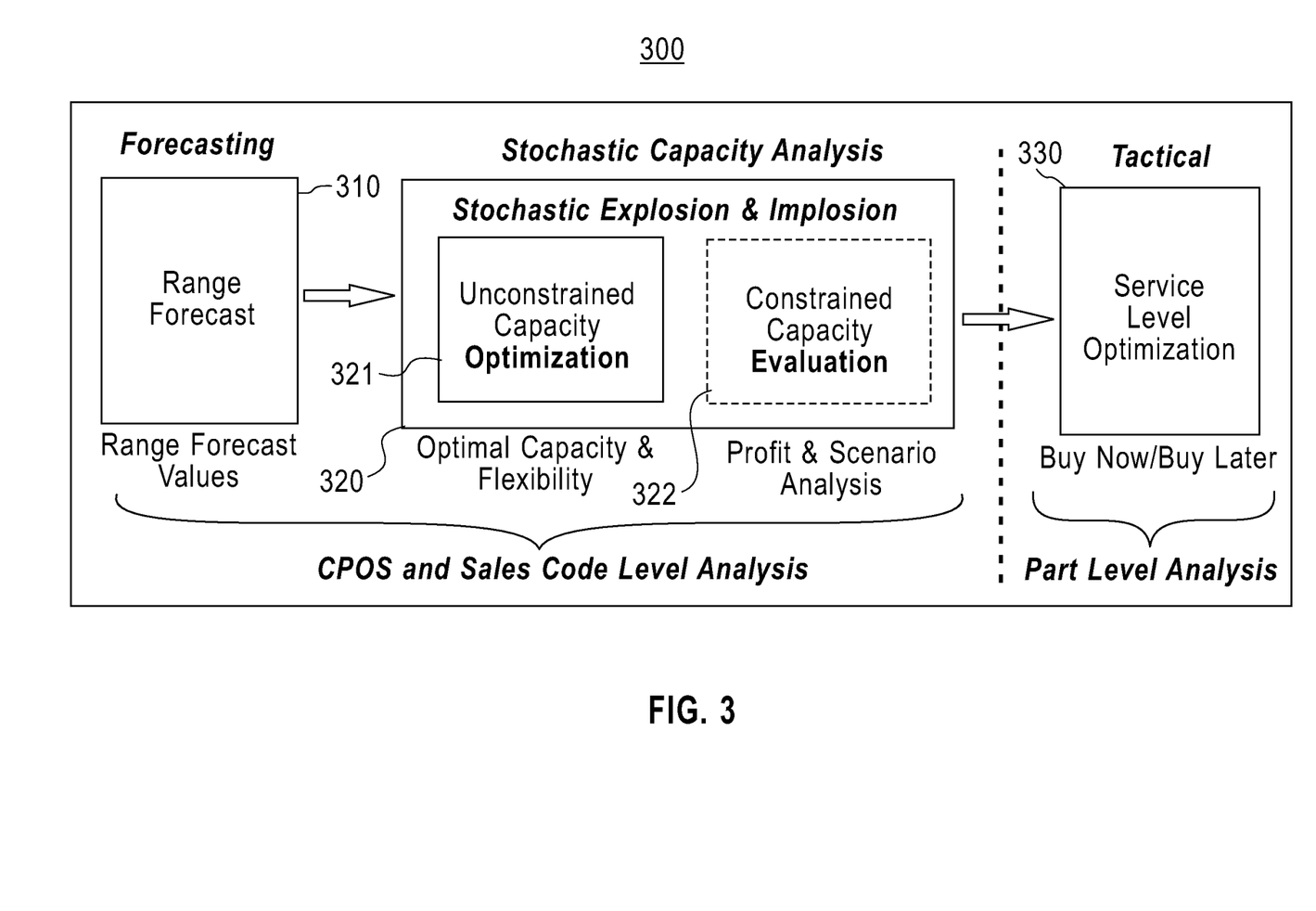
FIG. 3 shows an example 300 of solution components and flow of the present invention.

Referring now to the drawings, and more particularly to FIG. 2, there are shown exemplary embodiments of the method and structures according to the present invention.

FIG. 2 illustrates a product hierarchy of an automotive product which includes family 210, engine/transmission/body style 221-224, CPOS (Customer Preferred Option Selection) 231-235, options sales code 241-243, and part numbers 250. Top-level forecasts are utilized to convert attach rates into forecast ranges of demand volumes (i.e., range demand forecasts) at the CPOS, sales code, and part number levels of the hierarchy. Capacity recommendations are made at the CPOS and sales code levels of the hierarchy. The stochastic optimization procedure provides capacity recommendations in the form of an average capacity requirement and a SmartFlex™ uplift range that balances excess capacity with product shortage risk.

The decision faced in the long-term supply planning phase is represented by a stochastic explosion model. The stochastic explosion model differs from a traditional Material Requirements Planning (MRP) explosion model in that it explicitly accounts for configuration uncertainty, as represented by the range forecast of attach rates, inherent in the automotive supply chain. It also accounts for component dependencies and commonality of sales codes or part numbers across vehicle models or programs. The solution to the stochastic explosion model determines a risk-adjusted, profit maximizing capacity plan corresponding to the top-level volume targets set in the long-term demand planning stage.

Supplier capacity limitations or other procurement considerations may lead to cases where the supply volumes that suppliers are able to commit will deviate from the optimal capacity plan determined by the stochastic explosion model. Therefore, a thorough review of the capacity and top-level demand plan is preferably done to achieve alignment of demand and supply over the planning horizon. This alignment problem is captured by a stochastic implosion model. Its solution suggests how the achievable component supply—constrained by the capacities and flex positions maintained by suppliers—should exemplarily be adjusted so as to maximize expected profit. As in the explosion model, the implosion model accounts for uncertainty in the way finished products are configured. The final capacity plan produced by the model leverages any flexibility in supplier capacities to determine the quantities of all finished products that can be optimally supported by the supply chain over the planning horizon.

The desired financial or operational objective of the stochastic capacity optimization problem is formulated as the following:
Profit optimization: Find a capacity plan that maximizes overall profitability (e.g., Revenue-Cost of Goods Sold-Cost of capacity investment-Loss of customer goodwill due to product shortages).

The goal is to capture the trade-offs between the cost of capacity expansion to account for shortage risk and the cost of unused capacity to account for overage risk.

The model employs advanced forecasting and stochastic optimization techniques to find profit-optimal flex positions that balance excess capacity with product shortage risk, mitigating the cost of underutilized assets and missed revenue. It takes into account factors including demand uncertainty, profitability, service level objectives, capacity costs, and liability costs, and it allows the analysis of flex positions against demand range forecasts and confidence limits. In conjunction with the range forecast, the capacity optimization model enables planners to estimate the financial performance of a product portfolio as function of flex. An exemplary objective is to maximize risk-adjusted portfolio return by optimizing flex alternatives based on excess and overage exposure, liabilities, and lost sales risk.

The capacity optimization problem is formulated as a multi-period stochastic programming problem with recourse. The multi-period formulation has the advantage that changes in the top-level demand or attach rate distributions over the product life cycle can be incorporated into the capacity procurement decisions.

For example, if there is a sales code that is used exclusively in a single vehicle program in the first year and the sales code is adopted by other vehicle programs in subsequent years, then it may be better to make a nominal capacity investment in the first year and gradually expand the capacity over the following years, as opposed to buying all tooling equipment at once and keeping large portions of it idle in the first year.

Conversely, if there is a sales code that is used in a vehicle program whose product life cycle is expected to end in the next year, then it may be better to incur shortage costs or penalties for substituting the sales code with an alternative, as opposed to buying additional tools and keeping them idle in future years.

The optimization model utilizes the information in scenario-based forecast estimates and generates an efficient capacity plan over the multi-period planning horizon. The first stage variables are the amounts of capacity procured for each sales code, and the second stage variables determine the allocation of different sales codes to customer demand (expressed as demand at the price class/body style level) in each demand scenario. This is one of the first models that explicitly captures uncertainty in demand and uncertainty in customer option preferences while generating a capacity procurement plan. Since an industry-sized capacity planning problem is very large (hundreds of sales codes and thousands of parts to build the sales codes resulting in an exponentially large number of possible demand and attach rate realizations), it is nearly impossible to obtain the truly optimal capacity plan within a reasonable time. Therefore, the present inventors use a statistical approach, called Sample Average Approximation (SAA), that is particularly suitable for solving stochastic programs with very large scenario spaces when exact stochastic programming techniques become ineffective.

Subject matter experts can provide a top-level demand forecast—either in the form of a point forecast or a range forecast—for one or more vehicle programs at the level of price class/body style. These top-level sales targets will be established by a demand planning team in the long-term demand planning phase. An objective of the stochastic capacity optimization is to determine the capacity and flex position of each CPOS package and options sales code so as to meet established sales targets and maximize expected (discounted) profit over the planning horizon.

The capacity and flex positions are determined in the presence of order configuration uncertainty as represented by range forecasts of attach rates. The optimized capacity plan will account for correlations that arise out of product dependencies, CPOS package rules and bill-of-materials relationships. The optimized capacity plan will take advantage of risk-pooling effects that arise from commonality at the sales code level, i.e., sales codes that are used in multiple CPOS packages and sales codes that are used across multiple vehicle programs. For best results, the top-level demand and the attach rates forecasts should be stated as a range forecast so that the financial risk can be captured effectively.

Data inputs and notation are used to formulate the stochastic capacity optimization problem. The data inputs comprise of top-level sales forecasts, sales code attach rates, contribution margins, shortage costs, and capacity investment costs. The following planning parameters determine the size of the optimization problem.

T: The number of planning periods (model years) in the planning horizon, indexed by t. The planning horizon in the long-term capacity planning phase is typically 4-6 years in yearly time buckets.

S: The number of sales codes and CPOS packages for which capacities must be determined, indexed by j.

P: The number of vehicle families (specified at a price class/body style level), indexed by p.

Sales Forecasts

Sales forecasts ensure that the recommended capacity plan can support the demand volume established by subject matter experts.

$D_{pt}$: Random variable for the top-level demand forecast of vehicle program p in time period t for p=1, 2, . . . , P and t=1, 2, . . . , T. The demand can be provided either in the form of a point forecast or a range forecast (e.g., mean and standard deviation, or alternatively, mean, minimum and maximum value). D represents the vector of random variables ($D_{11}$, $D_{12}$, . . . , $D_{PT}$).

Product Structure

The product structure is provided in the form of a bill-of-materials structure for the selected set of Price Class/Body Style combinations and includes CPOS package and sales code information.

Additional inputs are product configuration rules that define existing relationships between Sales Codes within a Sales Code Class (substitution rules) as well as attach rate properties that may apply to a given Sales Code Class. These include:

Optional: The Sales Code is considered to be a non-essential option for which a customer would still purchase the car if the Sales Code were not available.

Mandatory: The Sales Code is considered to be an essential option such that a customer requesting it would not purchase the system without the Sales Code.

Selective Sets: This case is used when a Sales Code is one of a multiple choice set of Sales Code where each saleable car must have one and only one Sales Code selected from the set. Thus, no particular Sales Code within a set is mandatory, but it is mandatory that one be selected.

Sales code attach rates explode the sales forecasts at price class/body style level all the way down to the sales code of the end vehicle. Point forecasts and (so far as is feasible) range forecasts of the attach rates will be supplied by a forecasting model (Module 1). Alternatively, attach rate information supplied by subject matter experts may be used.

$a_{jpt}$: Random variable for the attach rate of sales code j for vehicle program p in time period t for j=1, 2, . . . , S and p=1, 2, . . . , P and t=1, 2, . . . , T. a represents the vector of random variables ($a_{111}$, $a_{112}$, . . . , $a_{SPT}$).

ω is a set of N demand scenarios where each demand scenario $\omega^i$ can be obtained by sampling from the distributions of the demands $D_{pt}$ and the attach rates $a_{jpt}$ using the simulation techniques described above (see section entitled Simulation of scenarios of attach rates below). The sampled (deterministic) values of the demands and attach rates in a demand scenario $\omega^i$ are denoted by $D_{pt}(\omega^i)$ and $a_{jpt}(\omega^i)$ in the remainder of this section. Further, let D(ω) represent the vector ($D(\omega^1)$, . . . , $D(\omega^N)$) and let a(ω) represent the vector ($a(\omega^1)$, . . . , $a(\omega^N)$).

Vehicle Profit Margins

To assess the expected profitability of a sourcing strategy, information on the profitability of each saleable vehicle configuration is needed. This includes CPOS and Sales Code profit margins and costs, or alternatively, Sales Code revenue and costs. The cost of a CPOS or Sales Code is the estimated cost of purchasing a given CPOS or Sales Code from a supplier. The gross profit captured from the sale of a given end vehicle can be estimated as the gross profit of the base configuration, combined with the gross profit of all CPOS and Sales Codes selected for the vehicle.

$q_{jt}$: Average unit profit (contribution margin) of sales code j in time period t for j=1, 2, . . . , S and t=1, 2, . . . , T.

$u_{pt}$: Average unit profit for vehicle program p in time period t for p=1, 2, . . . , P and t=1, 2, . . . , T. This parameter can be computed from the contribution margins $q_{jt}$ and the sales codes attach rates $a_{jpt}$ as $$u_{pt} = \sum_{j=1}^{S} a_{jpt} q_{jt}$$

Shortage Cost

Shortage costs are an appropriate means of modeling delivery performance in an environment where customer satisfaction is increasingly important. Shortage costs can be estimated as loss of customer goodwill. The loss of goodwill is difficult to quantify because it involves estimating the future revenue pertaining to a customer that intends to purchase an end vehicle. The idea is that a delinquent vehicle loses a portion of its assigned future revenue, the longer the delinquency the more it loses. The future revenue derived from a customer is sometimes referred to as customer lifetime value. It is known that loss of goodwill is the main driver of shortage costs, and it may account for up to 80 percent of the shortage costs.

$s_{pt}$: Shortage cost for vehicle program p in time period t for p=1, 2, . . . , P and t=1, 2, . . . , T.

Shortage costs can be provided as an average cost for each vehicle program, or derived from sales code level data.

Capacity Cost

Capacity costs are used by the optimization model to assess the overall investment cost and profitability of a capacity plan. In the capacity planning stage where capacities are determined at the sales code level, capacity costs must be provided by Sales Code as a per unit capacity cost.

$c_{jt}$: Capacity cost for one unit of sales code j in time period t for j=1, 2, ..., S and t=1, 2, ..., T.

The stochastic capacity planning problem can be formulated as a two-stage stochastic programming problem with recourse. The first-stage variables representing the amount of capacity to be procured are decided before the demands are known. The second-stage continuous variables representing the allocation of capacity to vehicle programs are the best recourse action to take, so that the (discounted) supply chain profit is maximized. The first-stage variables are chosen so that the expected profit (expectation with respect to demand and configuration uncertainty) realized in the second stage is maximized.

The output of the optimization is an optimized capacity plan for all sales codes pertaining to the selected set of vehicle programs. Capacity recommendations are provided in the form of a base capacity plus upside flexibility for each sales code so that the expected (discounted) profit of the firm is maximized over all possible demand and attach rates scenarios.

$X_{jt}$: The amount of capacity (base capacity plus upside flexibility) recommended for sales code j in model year t for j=1, 2, ..., S and t=1, 2, ..., T. The set of variables $X_{jt}$ represents the hedging decision of the stochastic programming problem. The capacity plan X is represented as the vector of decision variables ($X_{11}$, $X_{12}$, ..., $X_{ST}$).

An additional set of outputs is the expected number of configured saleable vehicles that can be produced in each vehicle program under the recommended capacity plan. This information is useful for subsequent scenario analyses where the recommended capacity plan can be modified and re-evaluated, or for conducting sensitivity analyses for different values of the cost or profit parameters.

$Y_{pt}$: The number of vehicles of program p that can optimally be built in time period t when given the capacity decisions $X_{jt}$ for p=1, 2, ..., P and j=1, 2, ..., S and t=1, 2, ..., T. The set of variables $Y_{pt}$ represents the recourse decision of the stochastic programming problem. The recourse decision for a given demand scenario $\omega^i$ is denoted as $Y_{pt}(\omega^i)$ for i=1, ..., N.

Mathematical Formulation

Next is presented an exemplary capacity optimization problem where a manufacturer plans procurement of capacity based on the current demand forecast for a set of price/class/body style combinations, and the distribution of attach rates for each of these forecasts.

The stochastic capacity optimization problem can be expressed in the form of a profit maximization problem as follows:

Stochastic Capacity Optimization Problem:

$$\max_{X_{jt} \geq 0} Z(X_{11}, X_{12}, \ldots, X_{ST}) = -\sum_{j=1}^{S} \sum_{t=1}^{T} c_{jt} X_{jt} + Q(X, D, a) \quad (6)$$

subject to the constraints $$X_{jt} \leq X_{j,t+1} \text{ for all } j=1,2,\ldots,S \text{ and } t=1,2,\ldots,T \quad (7)$$

where the second term in the objective function represents maximum total expected profit over all realizations of demand given the capacity decision X.

The constraints (7) ensure that capacities are non-decreasing over time. It is assumed that capacity cannot be decreased or "sold off" over time, however, capacities can be expanded over time by procuring additional tooling in later planning periods. The total reward of the capacity plan given by (6) is evaluated by the expected profit from sales minus the expected shortage costs incurred due to unfulfilled demand at the end of a planning period. The first term in the objective function (6) is the total investment cost for procuring capacity $X_{jt}$ for all sales codes j=1, 2, ..., S over the planning horizon. The second term, Q(X,D,a), is the maximal total expected profit attainable under a recommended capacity plan X over all possible demand scenarios $\phi$ and is expressed as:

$$Q(X,D,a) = E_\phi[Q(X,D(\phi),a(\phi))] \quad (8)$$

The term Q(X, D($\phi$), a($\phi$)) is the maximal total profit under a single demand scenario $\phi$ for a recommended capacity plan X. It can be obtained by solving the following sub-problem:

$$Q(X, D(\phi), a(\phi)) = \max_{Y_{pt} \geq 0} \sum_{p=1}^{P} \sum_{t=1}^{T} u_{pt}(\phi) Y_{pt} - \sum_{p=1}^{P} \sum_{t=1}^{T} s_{pt}(D_{pt}(\phi) - Y_{pt}) \quad (9)$$

subject to the constraints $$D_{pt}(\phi) \geq Y_{pt} \text{ for all } p = 1, 2, \ldots, P \text{ and } t = 1, 2, \ldots, T \quad (10)$$

$$X_{jt} \geq \sum_{p=1}^{P} a_{jpt}(\phi) Y_{pt} \quad (11)$$

$$j = 1, 2, \ldots, S \text{ and } t = 1, 2, \ldots, T$$

Constraints (10) indicate that the total number of vehicles that can be allocated to a vehicle program is less than or equal to the top-level demand $D_{pt}(\phi)$. Constraints (11) indicate that the total number of sales codes than can be allocated to all vehicle programs in each scenario is limited by the available capacity of that sales code. Notice that the allocation quantities $Y_{pt}$ are modeled as continuous variables because these are typically large values in which case such an assumption is reasonable.

For a given set of N demand scenarios $\omega=(\omega^1, \ldots, \omega^N)$, the deterministic equivalent of the above stochastic program can be expressed as:

$$V^{(N)} = \max_{X,Y \geq 0} -\sum_{j=1}^{S} \sum_{t=1}^{T} c_{jt} X_{ij} + \quad (12)$$

$$\frac{1}{N} \sum_{i=1}^{N} \left[ \sum_{p=1}^{P} \sum_{t=1}^{T} u_{pt}(\omega^i) Y_{pt}^i - \sum_{p=1}^{P} \sum_{t=1}^{T} s_{pt}(D_{pt}(\omega^i) - Y_{pt}^i) \right]$$

subject to the constraints $$X_{jt} \leq X_{j,t+1} \text{ for all } j = 1, 2, \ldots, S \text{ and } t = 1, 2, \ldots, T \quad (13)$$

-continued $$D_{pt}(\omega^i) \geq Y_{pt}^i \text{ for all } p = 1, 2, \ldots, P, t = 1, 2, \ldots, T \quad (14)$$

and $i = 1, 2, \ldots, N$ $$X_{jt} \geq \sum_{p=1}^{P} a_{jpt}(\omega^j) Y_{pt}^i \text{ for all } j = 1, 2, \ldots, S, t = 1, 2, \ldots, T \quad (15)$$

and $i = 1, 2, \ldots, N$

If N is the number of all possible demand scenarios, then the solution of the deterministic problem (12)-(15) would represent the capacity plan X that maximizes the expected total profit pertaining to the original stochastic capacity optimization problem (6)-(11).

Sample Average Approximation

The stochastic capacity optimization problem represented by constraints (6)-(11) is formulated as a two-stage stochastic program with recourse. In this problem, the uncertainty in vehicle demand and sales code attach rates is captured by the scenario space, where each scenario expresses one possible realization of demand and attach rates. In situations where the number of scenarios is large, it can be difficult to determine the optimal solution to the problem modeled by (6)-(11) using traditional optimization methods. The present invention solves this problem by using an approximation method based upon a Monte Carlo simulation-based approach called the Sample Average Approximation (SAA) method.

The SAA method approximates the expected objective function of the stochastic program with a sample average estimation based on a number of randomly generated sample scenarios. It solves a number of deterministic equivalent instances of the stochastic explosion problem and seeks to optimize the average of the objective (expected discounted profit) across the sampled scenarios. The combination of sampling followed by deterministic optimization is well established and used in other simulation-based optimization techniques such as Sample-Path Optimization and Infinitesimal Perturbation Analysis. Because the number of scenarios in the stochastic capacity optimization problem is prohibitively large, the SAA method considers sample average functions whose values depend only on a small subset of all scenarios. For a two-stage stochastic program with recourse, the SAA method samples scenarios from the set of all possible scenarios, and seeks to optimize the average of the second stage objective across the sampled scenarios. When the sample space is extremely large, multiple sub-problems generated from multiple, independent groups of samples need to be solved.

Figure 4:
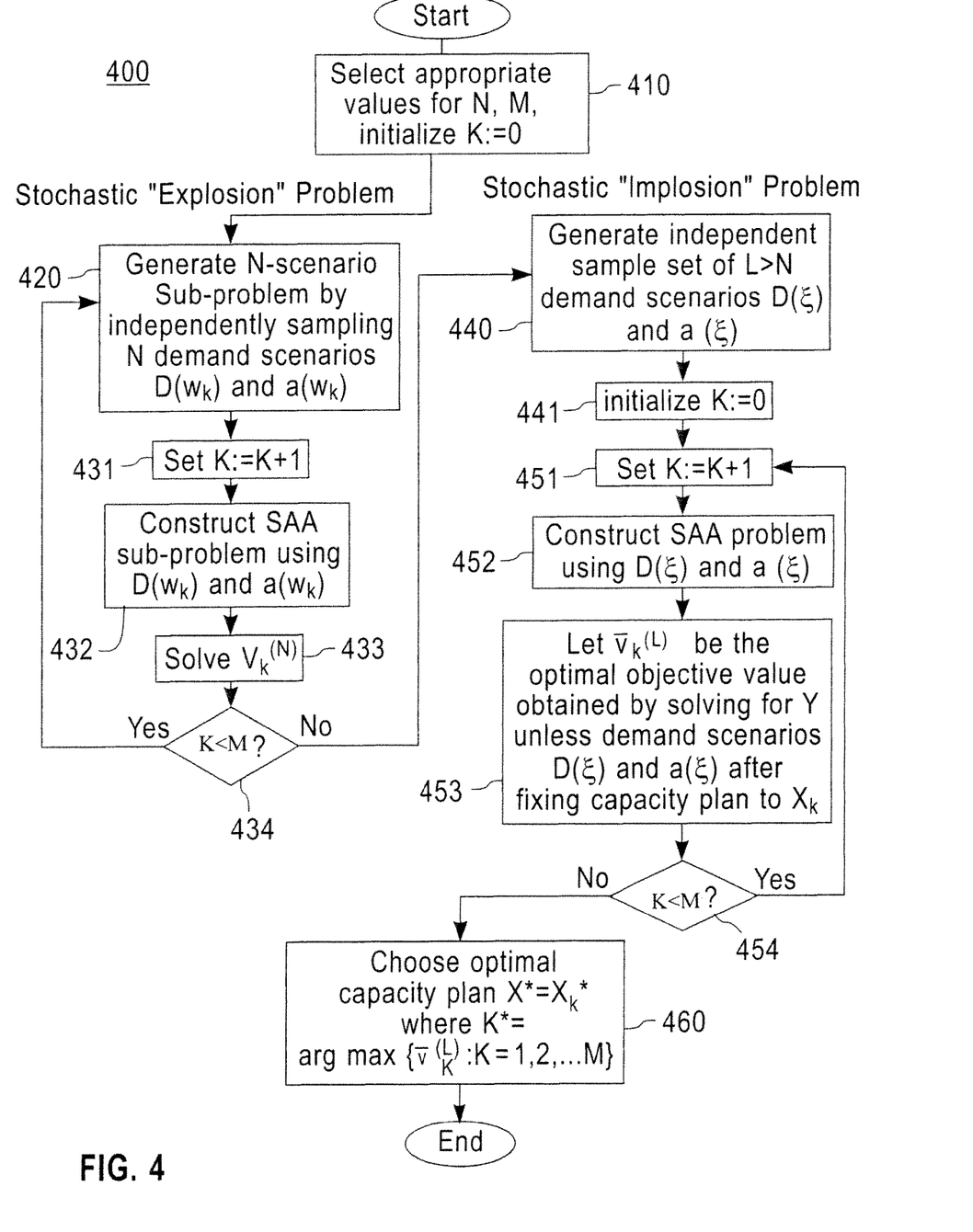
FIG. 4 shows a flowchart 400 of Sample Average Approximation as used in the present invention.

FIG. 4 illustrates the process.

First, select appropriate values 410 for N, M and initialize k:=0 (410).

Then work the stochastic 'explosion' problem as follows: Generate an N-scenario sub-problem 420 by independently sampling N demand scenarios $D(\omega_k)$ and $a(\omega_k)$ from the scenario space where $\omega_k = (\omega_k^1, \omega_k^2, \ldots, \omega_k^N)$. Set (431) k:=k+1 and construct 432 the SAA sub-problem (12)-(15) using $D(\omega_k)$ and $a(\omega_k)$. Solve $V_k^{(N)}$ optimally to get $X_k$. If k<M, then go to 420; otherwise go to 440.

Work the stochastic 'implosion' problem as follows: Generate 440 an independent sample set that consists of L>N demand scenarios $D(\xi)$ and $a(\xi)$ where $\xi = (\xi^1, \xi^2, \ldots, \xi^L)$ and initialize (441) k:=0. Set (451) k:=k+1 and construct 452 the SAA problem (12)-(15) using $D(\xi)$ and $a(\xi)$. Step 453, let $\overline{V}_k^{(L)}$ be the optimal objective value of (12)-(15) obtained by solving for Y under the demand scenarios $D(\xi)$ and $a(\xi)$ after fixing the capacity plan to $X_k$. If k<M then go to 451; otherwise go to 460.

Finally, choose the optimal capacity plan $X^* = X_{k^*}$ where $$k^* = \arg\max\{\overline{V}_k^{(L)}: k=1,2,\ldots,M\}.$$

---

BEGIN
1. Select appropriate values for N, M and initialize k:=0
Stochastic "Explosion" Problem:
2. Generate an N-scenario sub-problem by independently sampling N demand scenarios $D(\omega_k)$ and $a(\omega_k)$ from the scenario space where $\omega_k = (\omega_k^1, \omega_k^2, \ldots, \omega_k^N)$.
3. Set k:=k+1 and construct the SAA sub-problem (12)-(15) using $D(\omega_k)$ and $a(\omega_k)$. Solve $V_k^{(N)}$ optimally to get $X_k$. If k<M go to step 2; otherwise go to Step 4.
Stochastic "Implosion" Problem:
4. Generate an independent sample set that consists of L>N demand scenarios $D(\xi)$ and $a(\xi)$ where $\xi = (\xi^1, \xi^2, \ldots, \xi^L)$ and initialize k:=0
5. Set k:=k+1 and construct the SAA problem (12)-(15) using $D(\xi)$ and $a(\xi)$. Let $\overline{V}_k^{(L)}$ be the optimal objective value of (12)-(15) obtained by solving for Y under the demand scenarios $D(\xi)$ and $a(\xi)$ after fixing the capacity plan to $X_k$. If k<M go to Step 5; otherwise go to Step 6.
6. Choose the optimal capacity plan $X^* = X_{k^*}$ where $k^* = \arg\max\{\overline{V}_k^{(L)} : k = 1,2,\ldots,M\}$
END

---

The SAA method approximates the true objective function with a sample average objective function that consists of only a subset of all possible scenarios. For example, if there are K possible scenarios, then instead of expressing the expected profit as an average over all K scenarios (i.e., the true objective function), the SAA method approximates this function using an average taken over only N scenarios, where N is typically much smaller than K (i.e., N<<K). Thus, the SAA method is able to determine the solution to stochastic problems with large scenario spaces by considering a carefully selected subset of all possible scenarios.

In order to achieve statistically robust results, the SAA method solves multiple independently sampled N-scenario sub-problems. The number of independent N-scenario problems solved is given by M. Each of the M sub-problems, when solved, results in a candidate solution to the original capacity allocation problem (e.g., a candidate capacity investment decision). The SAA method selects the one solution from the M candidate solutions as the final solution to the original stochastic optimization problem. This final solution selected by the SAA method typically is not optimal, but its 'closeness' to optimality can be statistically quantified in order to evaluate its quality. As the sample size N increases, computational complexity of the SAA problem increases but the solution quality of the SAA problem improves. Trade-offs can be made between the size of N and M to determine the appropriate level of computational tractability and solution quality.

The SAA method has been successfully applied to solve large-scale stochastic planning problems. The present inventors have applied SAA to solve an industry-size stochastic explosion problem for System p server computers manufactured by the Assignee. The results showed that the value of the stochastic solution that accounts for product configuration uncertainty is far superior to the solution produced when uncertain quantities are replaced with their expected (i.e., average) values.

Simulation of Demand Scenarios

For use by the SAA method, the final set of range forecasts created in Module 1 will be stored in a form that enables the generation of scenarios of future demand. In the simplest case, the errors in forecast attach rates stored as a vector a, or some transformed values of them stored as a vector g(a), will have errors that follow a multivariate probability distribution that will be defined by the form of its univariate marginal distributions, any parameters (location, scale, shape) needed to specify these distributions, and further parameters defining its dependence structure. For example, it might be a multivariate normal distribution specified by its mean vector $\mu$ and covariance matrix $\Sigma$.

Considered below is the simplest case, in which point forecasts of attach rates stored as a vector a, or some transformed values of them stored as a vector g(a), will have errors that follow a multivariate normal distribution with mean vector $\mu$ and covariance matrix $\Sigma$. Generation of random variates from a standard multivariate normal distribution, with zero mean vector and identity covariance matrix, is straightforward. Given a random variate z from a standard multivariate normal distribution, the vector $\mu+Lz$, where L is a matrix square root of $\Sigma$, i.e. $LL^T=\Sigma$, has a multivariate normal distribution with mean vector $\mu$ and covariance matrix $\Sigma$. Thus, given a vector a of point forecasts, and a random variate z generated from the standard multivariate normal distribution, the vector $g^{-1}(g(a)+\mu+Lz)$ is a random scenario of future attach rates. This procedure can be repeated many times, with the random variate z generated independently each time (but a remaining unchanged) to build up a population of scenarios.

Depending on the form of the forecast error distributions, the generation procedure may need to be more complex than this. However, the forecasting module will try to find transformations of attach rates so that they can be effectively modeled by the multivariate normal or some other distribution from which random variates can be rapidly generated.

Next is described how an exemplary application can be used to solve the above instances of the Stochastic Explosion and Stochastic Implosion problems.

The exemplary application can be used to perform both the explosion and the implosion phase of the SAA algorithm. The exemplary model is very general and has been used to optimize networks for allocating service personnel to service engagements, flows of wafers in semiconductor fabrication facilities, distribution of consumer packaged goods from the manufacturer through distribution center to the retail outlet, Assignee's internal Server Group supply chain, and many other applications.

The exemplary model allows one to describe a constrained production network. The exemplary algorithms optimize the allocation of the constrained resources to the demands in the network. Specifically, the exemplary implementation provides two alternative algorithms to solve this class of problems:

A heuristic algorithm based on demand priorities.

A linear programming (LP) approach based on economic data.

Because data for the capacity optimization problem is fundamentally economic in nature (costs and profits), the LP approach is the exemplary implementation algorithm most appropriate for this context. The LP approach takes a problem (expressed as a network of operations, materials, capacities and demands along with various data attributes), formulates it as an LP problem (expressed as a set of variables, constraints and an objective function), solves the LP problem, and then translates the LP solution into a solution to the exemplary problem.

The exemplary implementation is implemented in an approachable way that allows one to understand and deploy the technology. The exemplary Application Programming Interface (API) is a well documented C programming interface that provides the solution designer the capability to describe the exemplary model and solution technique.

The exemplary application is deployed as a production system in various capabilities at the Assignee, including an application for unconstrained supply planning (MRP explosion) and constraint-based supply planning (implosion) at the Assignee's Systems and Technology Group (STG). This application is a key component of STG's end-to-end supply-demand planning process that is executed twice a month for 10 fulfillment centers and 28 manufacturing plants worldwide. Each run involves approximately 5,000 flexible and 15,000 traditional bill-of-material relationships by plant. Typical execution times for a production run with a 32-week planning horizon vary between 5 and 15 minutes on a regular workstation. The main purpose is to determine the unconstrained component demands which are passed to suppliers for assessment, and, after suppliers respond with capacity limits, to match component capacity against product demand to determine product shortfalls and critical constraints.

The present invention uses the exemplary implementation for solving the Stochastic Explosion Problem and the Stochastic Implosion Problem in the algorithm of FIG. 4. In the stochastic implosion, the capacity decision is fixed and is to be evaluated by solving a series of deterministic problems, one for each stochastic scenario being considered. The deterministic problem to be solved in this module is a natural fit for the exemplary implementation's optimizing implosion capability. The problem has a single-level bill-of-material (BOM) structure in which the primary relationship between the individual sales codes and the products to which they contribute would be modeled using BOM arcs in the exemplary implementation's model. As previously observed, there are various forms of flexibility in the relationship between sales codes and products: "Optional", "Mandatory", and "Selective Sets". Each of these cases would be modeled in WIT through the appropriate use of substitution arcs.

The exemplary implementation's application code for solving the stochastic implosion problem has the following inputs:

A specification of the product structure, including primary relationships between products and sales codes and their attach rates.

A specification of the flexible relationships between products and sales codes: "Optional", "Mandatory", and "Selective Sets".

Demand volumes.

Capacity levels.

Cost and profit data.

The outputs include a specification of the extent to which each demand was met or missed, the capacity utilization, and the total profit. The exemplary implementation's application code acquires the inputs indicated above, constructs the appropriate model in exemplary implementation's, invokes the exemplary implementation's built-in optimizing implosion capability, extracts the implosion solution, and provides the outputs indicated above.

This procedure is invoked once for each stochastic scenario to be considered. In this case of the stochastic explosion problem, a two-stage stochastic linear programming problem is to be solved where the determination of capacity levels is the decision in the hedging stage and the meeting of demands is the decision in the recourse stage.

The exemplary implementation's model may be applied in the following ways:
- If there are N scenarios to be considered in the stochastic optimization, the exemplary implementation's model can include N copies of the basic model described for module 3, one for each scenario. The N copies differ in the ways in which the scenarios differ: Each has its own set of attach rates. The cost and profit data is scaled (multiplied) by the probability of each scenario. This is the "recourse" part of the model.
- A set of operations can be added to the model, whose purpose is to produce the capacity of the sales codes. This set of operations is not duplicated. This is the "hedging" part of the model.
- Production arcs can be added, connecting each capacity production operation with the sales code that it produces in each scenario.

The exemplary implementation's application code can be applied in the following ways:
- The number of scenarios and the probability of each can be specified.
- While the basic product structure and so forth can be specified once for the whole model, the attach rates can be specified for each scenario.
- Capacity levels would not be required as an input.

As before, the exemplary implementation's application code would acquire the inputs indicated above, construct the appropriate model in exemplary implementation, invoke the exemplary implementation's built-in optimizing implosion capability, extract the implosion solution, and provide as outputs the optimized capacity plan and the expected total profit. This procedure would be invoked once for each stochastic linear programming problem to be solved.

While the invention has been described in terms of a single preferred embodiment, those skilled in the art will recognize that the invention can be practiced with modification within the spirit and scope of the appended claims.

Thus, for example, although an automotive scenario was used for purpose of discussion, other applications are clearly possible.

For another example, if a desired output of the invention is a materials requirements plan, a subset of the variables $(X_{jt})$ can be re-interpreted to represent material, non-capital and storable resources. Additionally, mathematical constraints can be appended to the sub-problem (equations (9)-(11)) that represent inventory flow constraints that control the 'movement' of inventory of these material resources from one period to another. As another example, if the desired output of the invention is a skills requirements plan, a subset of the variables $(X_{jt})$ can be re-interpreted to represent skill types. Additionally, if the desired output of the invention is a human resources deployment plan, then a subset of the variables $(X_{jt})$ can be re-defined to represent individuals. If desired, additional parameters can be defined to specify the skill types that each individual possesses, and constraint (equation (11)) can be modified to reflect the constraint that only individuals possessing the demanded skills can satisfy the demand for product/services.

Exemplary Hardware Implementation

Figure 5:
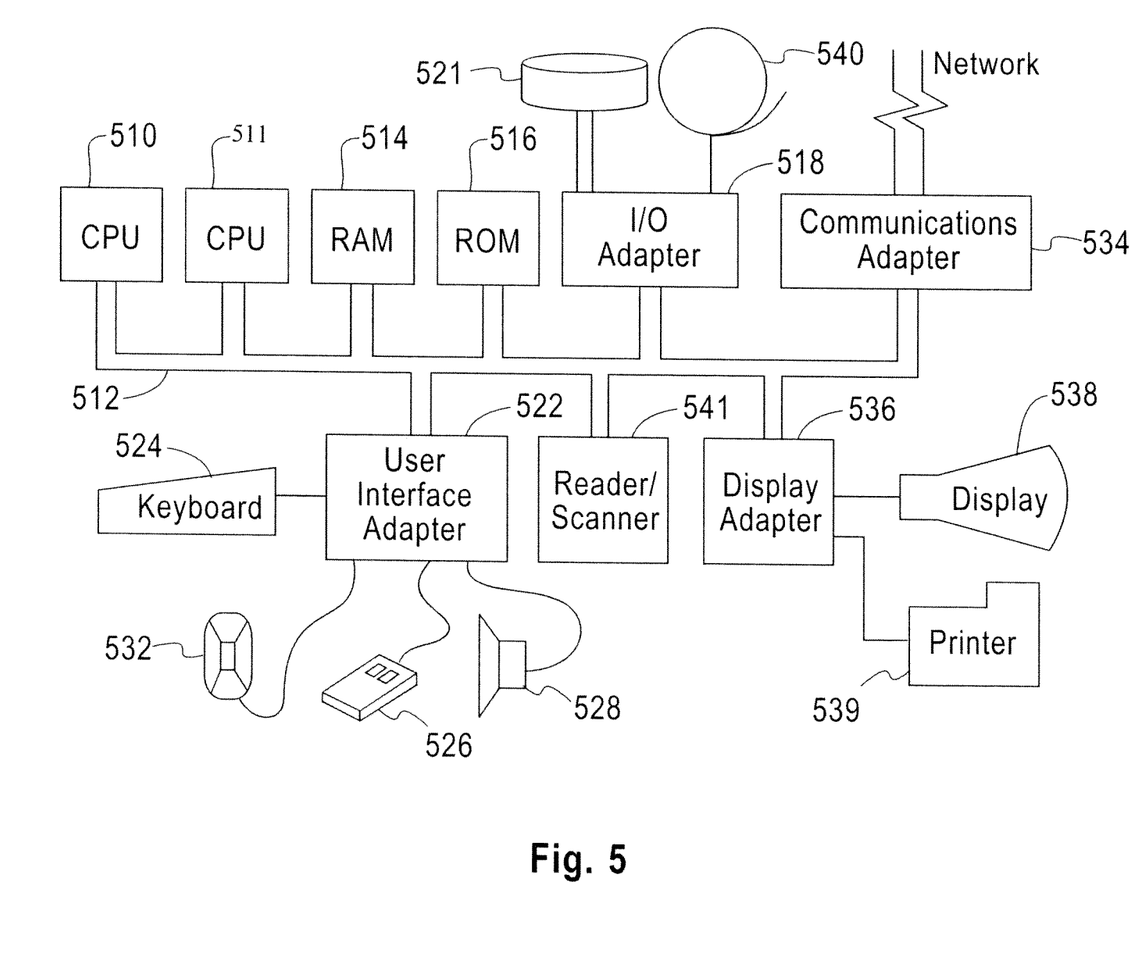
FIG. 5 illustrates an exemplary hardware/information handling system 500 for incorporating the present invention therein.

FIG. 5 illustrates a typical hardware configuration of an information handling/computer system in accordance with the invention and which preferably has at least one processor or central processing unit (CPU) 510 and 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Figure 6:
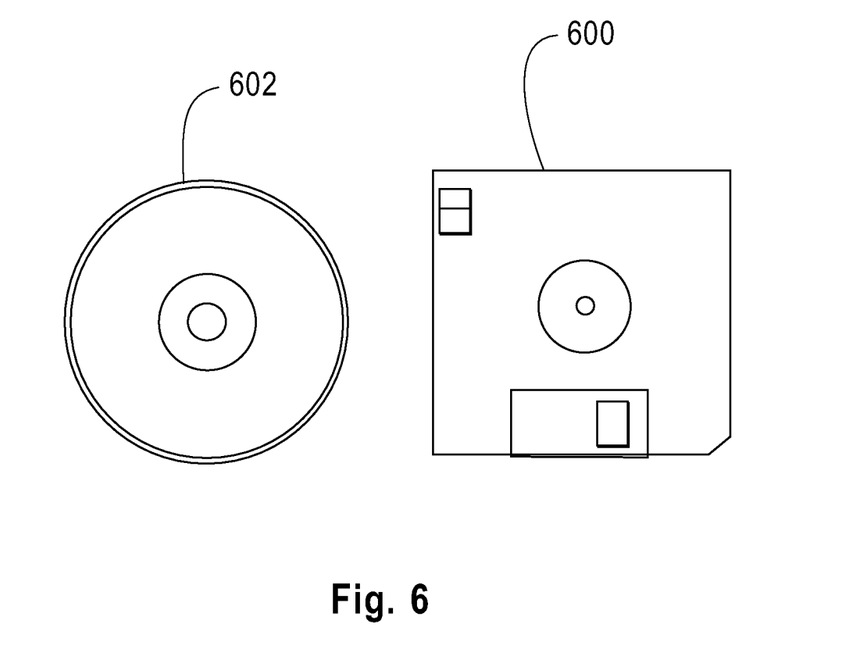
FIG. 6 illustrates a signal bearing medium 600 (e.g., storage medium) for storing steps of a program of a method according to the present invention.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code Further, it is noted that, Applicants' intent is to encompass equivalents of all claim elements, even if amended later during prosecution.

Having thus described our invention, what we claim as new and desire to secure by Letters Patent is as follows:

The invention claimed is:

1. A method for risk-based resource planning for configurable products, the method stored in a memory and executed by a processor, said method comprising:
processing a stochastic programming formulation based on forecast values of at least one of product and service configurations to optimize an objective function, the processing including treating attach rates as random variables;
inputting a plurality of different planning periods in a planning horizon;
determining a resource requirements plan for the plurality of different planning periods in a non-deterministic list of resources of at least two levels, and incorporating information relating to the random variables when determining the resource requirements plan; and
determining resources for the configurable products according to the resource requirements plan,
wherein the resource requirements plan is determined by a sample average approximation solving a plurality of independent sampled N-scenario sub-problems, where N is a positive integer less than all possible scenarios K, and wherein when determining the resource requirements plan that is optimized to configure a production of the configurable products, uncertainty of the resources for the configurable products is represented by the treating of the attach rates as random variables, and incorporating the information relating to the random variables;

outputting recommendations for the resources to produce the configurable products according to the resource requirement plan, the resources include capacity procurement, material procurement, and material production for the configurable products, the configurable products including vehicles; and producing the vehicles according to the resource requirement plan.

2. The method of claim 1, wherein said forecast values comprise random variables, wherein the sample average approximation comprises:
generating the plurality of independent sampled N-scenario sub-problems by independently sampling N demand scenarios from a scenario space;
constructing the sample average approximation using the N demand scenarios from the generated plurality of independent sampled N-scenario sub-problems; and
generating approximates of the objective function with a sample average objective function that includes a subset of all possible scenarios K, where K is an integer, and wherein when determining the resource requirements plan to configure a production of the configurable products, the uncertainty of the resource requirements plan is represented by defining the attach rate as a random variable in order to convert the attach rate into a forecast range of the production of the vehicles, wherein said stochastic programming formulation comprises a two-stage stochastic program with recourse, wherein the two-stage stochastic program comprises a first stage that includes variables for amounts of capacity of the configurable products, and a second stage that includes variables to determine allocation of a requested number of the configurable products.

3. The method of claim 2, wherein said forecast values are expressed as range forecasts, wherein the determining of the resource requirements plan for the plurality of different planning periods to produce the configurable products includes a plurality of vehicles.

4. The method of claim 1, wherein said resource requirements plan comprises at least one of:
a capacity investment plan;
a materials requirements plan;
a human resources deployment plan; and
a skills requirements plan.

5. The method of claim 1, wherein said product and service configurations comprise one or more of:
an optional feature or service component which is not required in a final product or service configuration;
a mandatory feature or service component which is required in a final product or service configuration; and
a selective set of features, where one or more feature or service components of said selective set are required in a final product or service configuration, wherein said stochastic programming formulation comprises a two-stage stochastic program with recourse, wherein the two-stage stochastic program comprises a first stage that includes variables for amounts of capacity of the configurable products.

6. The method of claim 1, wherein said forecast values of the at least one of product and service configurations selectively vary across planning periods.

7. The method of claim 1, wherein said stochastic programming formulation comprises a two-stage stochastic program with recourse, wherein the two-stage stochastic program comprises a first stage that includes variables for amounts of capacity of the configurable products, and a second stage that includes variables to determine allocation of a requested number of the configurable products, and wherein the resource requirements plan is determined with a solution to the sample average approximation solving the plurality of independent sampled N-scenario sub-problems, where K and N are integers, when there are K possible scenarios, the solution is an average over all K scenarios, to approximate the objective function using an average taken over the N scenarios.

8. The method of claim 1, wherein said planning under uncertainty comprises determining sales targets for products or services in one or more planning periods.

9. The method of claim 8, wherein said forecast values comprise random variables expressed as range forecasts.

10. The method of claim 9, wherein said product and service configurations comprise one or more of:
an optional feature which is not required in a final product configuration;
a mandatory feature which is required in a final product configuration; and
a selective set of features, where exactly one feature of said selective set is required in a final product configuration and comprises two or more levels in the list of resources.

11. The method of claim 8, further comprising inputting a number of the plurality of different planning periods in a planning horizon.

12. The method of claim 11, wherein said forecast values of finished products and of product and service configurations selectively vary across planning periods.

13. The method of claim 9, wherein said stochastic optimization is formulated as a two-stage stochastic program with recourse.

14. The method of claim 13, wherein said stochastic optimization is solved using Sample Average Approximation.

15. The method of claim 14, further comprising of selecting an optimal sales target from an independent sample set of demand scenarios.

16. The method of claim 15, further comprising restricting said sales target to be within predetermined constraints.

17. A non-transitory, computer-readable storage medium tangibly embodying a program of machine-readable instructions executable by a digital processing apparatus to perform a method of planning under uncertainty of configurable products, said method comprising:
processing a stochastic programming formulation based on forecast values of product and service configurations to optimize an objective function, the processing includes treating attach rates as random variables;
inputting a plurality of different planning periods in a planning horizon;

determining a resource requirements plan for the plurality of different planning periods in a non-deterministic list of resources of at least two levels, and incorporating information relating to the random variables when determining the resource requirements plan; and determining resources for the configurable products according to the resource requirements plan, wherein the resource requirements plan is determined by a sample average approximation solving a plurality of independent sampled N-scenario sub-problems, where N is an integer less than all possible scenarios K, and wherein when determining the resource requirements plan that is optimized to configure a production of the configurable products, uncertainty of the resource requirements plan in the configurable products is represented by defining the attach rates as the random variables, and incorporating the information relating to the random variables in order to convert the attach rate into a forecast range for the production of the apparatus of manufacture;

outputting recommendations for the resources to produce the configurable products according to the resource requirement plan, the resources include capacity procurement, material procurement, and material production for the configurable products, the configurable products including the apparatus of manufacture; and producing the apparatus of manufacture according to the resource requirement plan.

18. The non-transitory, computer-readable storage medium of claim 17, wherein said forecast values comprise random variables, wherein the sample average approximation comprises:

generating the plurality of independent sampled N-scenario sub-problems by independently sampling N demand scenarios from a scenario space;

constructing the sample average approximation using the N demand scenarios from the generated plurality of independent sampled N-scenario sub-problems; and generating approximates of the objective function with a sample average objective function that includes a subset of all possible scenarios K, where K is an integer, and wherein when determining the resource requirements plan to configure a production of the configurable products, the uncertainty of the resource requirements plan is represented by defining the attach rate as a random variable in order to convert the attach rate into a forecast range of the production of the vehicles, wherein said stochastic programming formulation comprises a two-stage stochastic program with recourse, wherein the two-stage stochastic program comprises a first stage that includes variables for amounts of capacity of the configurable products, and a second stage that includes variables to determine allocation of a requested number of the configurable products.

19. A computer system, comprising:

a processor executing a program; and a non-transitory computer readable medium storing the program, the processor configured to:

process a stochastic programming formulation based on forecast values of at least one of product and service configurations to optimize an objective function, and treating attach rates as random variables;

inputting a plurality of different planning periods in a planning horizon;

determine a resource requirements plan for the plurality of different planning periods in a non-deterministic list of resources of at least two levels, and incorporating information relating to the random variables when determining the resource requirements plan; and outputting recommendation for resources for production of the configurable products according to the resource requirements plan, wherein the resource requirements plan is determined by a sample average approximation solving a plurality of independent sampled N-scenario sub-problems, where N is an integer less than all possible scenarios K, and wherein when determining the resource requirements plan that is optimized to configure a production of the configurable products, uncertainty in the configurable products is represented by defining the attach rates as the random variables, and incorporating the information relating to the random variables in order to convert the attach rate into a forecast range;

outputting recommendations for the resources to produce the configurable products according to the resource requirement plan, the resources include capacity procurement, material procurement, and material production for the configurable products, the configurable products including vehicles; and producing the configurable products according to the resource requirement plan.

20. The computer system of claim 19, wherein said forecast values comprise random variables, wherein the sample average approximation comprises:

generating the plurality of independent sampled N-scenario sub-problems by independently sampling N demand scenarios from a scenario space;

constructing the sample average approximation using the N demand scenarios from the generated plurality of independent sampled N-scenario sub-problems; and generating approximates of the objective function with a sample average objective function that includes a subset of all possible scenarios K, where K is an integer, and wherein when determining the resource requirements plan to configure a production of the configurable products, the uncertainty of the resource requirements plan is represented by defining the attach rate as a random variable in order to convert the attach rate into a forecast range of the production of the vehicles, wherein said stochastic programming formulation comprises a two-stage stochastic program with recourse, wherein the two-stage stochastic program comprises a first stage that includes variables for amounts of capacity of the configurable products, and a second stage that includes variables to determine allocation of a requested number of the configurable products.

* * * * *